(12) United States Patent
Wei et al.

(10) Patent No.: US 11,265,964 B2
(45) Date of Patent: Mar. 1, 2022

(54) PACKET DATA CONVERGENCE PROTOCOL DUPLICATION IN NEXT GENERATION WIRELESS NETWORKS

(71) Applicant: FG Innovation Company Limited, Tuen Mun (CN)

(72) Inventors: Chia-Hung Wei, Hsinchu (TW); Chie-Ming Chou, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 36 days.

(21) Appl. No.: 16/745,360

(22) Filed: Jan. 17, 2020

(65) Prior Publication Data
US 2020/0236734 A1    Jul. 23, 2020

Related U.S. Application Data

(60) Provisional application No. 62/794,192, filed on Jan. 18, 2019.

(51) Int. Cl.
*H04W 80/08* (2009.01)
*H04W 76/11* (2018.01)
(Continued)

(52) U.S. Cl.
CPC ............ *H04W 80/08* (2013.01); *H04W 76/11* (2018.02); *H04W 76/27* (2018.02); *H04W 80/02* (2013.01)

(58) Field of Classification Search
CPC ..... H04W 80/08; H04W 76/11; H04W 76/27; H04W 80/02; H04W 76/15; H04L 1/08
See application file for complete search history.

(56) References Cited

U.S. PATENT DOCUMENTS

2018/0324642 A1* 11/2018 Yu .............................. H04L 1/22
2019/0289489 A1*  9/2019 Yi ............................ H04L 1/189
(Continued)

FOREIGN PATENT DOCUMENTS

| CN | 109151891 A | 1/2019 |
|---|---|---|
| WO | 2018203736 A1 | 11/2018 |
| WO | 2018204828 A1 | 11/2018 |

OTHER PUBLICATIONS

3GPP TSG-RAN WG2 #104; R2-1817251, Source: OPPO, Title: Discussion on data duplication for IIoT, Spokane, United States, Nov. 12-16, 2018. (Year: 2018).*

(Continued)

*Primary Examiner* — Hassan A Phillips
*Assistant Examiner* — Mohammed S Chowdhury
(74) *Attorney, Agent, or Firm* — ScienBiziP, P.C.

(57) ABSTRACT

Some of the present implementations provide a method for PDCP PDU duplication for a UE. The method receives, from a base station, through RRC signaling, a PDCP duplication entity and several RLC entities, an RLC entity being a primary path, and one or more of the RLC entities as active RLC entities for transmitting duplicated PDCP PDUs. The method generates one or more duplicated PDCP PDUs when a PDCP duplication function activation indicator is received, transmits the generated one or more duplicated PDCP PDUs to the one or more active RLC entities, and receives a MAC CE comprising a plurality of fields for switching at least one of the one or more active RLC entities, excluding the RLC entity that is the primary path, to an inactive RLC entity.

12 Claims, 6 Drawing Sheets

(51) Int. Cl.
*H04W 76/27* (2018.01)
*H04W 80/02* (2009.01)

(56) References Cited

U.S. PATENT DOCUMENTS

| | | | |
|---|---|---|---|
| 2020/0100179 A1* | 3/2020 | Zhou | G06F 1/3209 |
| 2020/0235897 A1* | 7/2020 | Tang | H04L 5/0032 |
| 2020/0267793 A1* | 8/2020 | Sharma | H04W 76/19 |
| 2020/0374752 A1* | 11/2020 | Xiao | H04W 28/06 |
| 2020/0389877 A1* | 12/2020 | Tang | H04W 72/042 |
| 2021/0058913 A1* | 2/2021 | Jang | H04W 76/28 |
| 2021/0084539 A1* | 3/2021 | Centonza | H04W 28/085 |
| 2021/0112610 A1* | 4/2021 | Xiao | H04W 28/04 |
| 2021/0211932 A1* | 7/2021 | Lu | H04W 80/02 |
| 2021/0297931 A1* | 9/2021 | Zhang | H04W 76/15 |

OTHER PUBLICATIONS

3GPP TSG-RAN WG2 #104; Tdoc R2-1817180, Source: Ericsson, Title: Multiple duplicate handling, Spokane, USA, Nov. 12-16, 2018 (Year: 2018).*

3GPP TSG RAN WG2 NR Ad Hoc; R2-1706716, Source: Huawei, HiSilicon, Title: Configuration and control of packet duplication; Qingdao, China, Jun. 27-29, 2017. (Year: 2017).*

Ericsson Multiple duplicate handling 3GPP TSG-RAN WG2 #104 Tdoc R2-1817180 Nov. 16, 2018(Nov. 16, 2018), the whole document.

VIVO Remaining issues of PDCP duplication 3GPP TSG-RAN WG2 Meeting #101R2-1801988 Mar. 2, 2018(Mar. 2, 2018), the whole document.

* cited by examiner

PACKET DATA CONVERGENCE PROTOCOL DUPLICATION IN NEXT GENERATION WIRELESS NETWORKS

CROSS-REFERENCE TO RELATED APPLICATION(S)

The present application claims the benefit of and priority to a provisional U.S. Patent Application Ser. No. 62/794,192, filed on Jan. 18, 2019, entitled "Reliability Improvements on PDCP Duplication," (hereinafter referred to as "US76406 application"). The disclosure of the US76406 application is hereby incorporated fully by reference into the present application.

FIELD

The present disclosure generally relates to wireless communications, and more particularly, to improving reliability on Packet Data Convergence Protocol (PDCP) duplication in the next generation wireless networks.

BACKGROUND

In order to achieve higher reliability (e.g., for the data packet transmission for the Ultra Reliable Low Latency Communication (URLLC) service), a new PDCP duplication mechanism for the Radio Access Network (RAN) has been introduced by the 3rd Generation Partnership Project (3GPP) for New Radio (NR). The duplication mechanism in PDCP layer includes submitting the same PDCP Protocol Data Units (PDUs) to the lower layer (e.g., the Radio Link Control (RLC) layer) twice, once to a primary RLC entity (or bearer) and a second time to an additional RLC entity (e.g., a secondary RLC entity). Therefore, the PDCP duplication mechanism may unnecessarily increase the number of PDU generations and transmissions (e.g., to different RLC entities) and, as a result, may reduce the overall spectral efficiency. There is a need in the art for an efficient PDCP duplication mechanism that has a proper restriction on PDU duplications when more than two duplication paths are configured on a User Equipment (UE).

SUMMARY

The present disclosure is directed to improving reliability on PDCP duplication in the next generation wireless networks.

In a first aspect of the present application, a method for PDCP PDU duplication for a UE is provided. The method comprises receiving, from a base station, through radio resource control (RRC) signaling, a PDCP duplication configuration for a PDCP entity, the configuration indicating: (i) an association between the PDCP entity and a plurality of RLC entities; (ii) an RLC entity in the plurality of the RLC entities being a primary path; and (iii) one or more of the RLC entities as active RLC entities for transmitting duplicated PDCP PDUs, the active RLC entities include RLC entities that are not indicated as the primary path; generating, by the PDCP entity, one or more duplicated PDCP PDUs when a PDCP duplication function activation indicator is received; transmitting, by the PDCP entity, the generated one or more duplicated PDCP PDUs to the one or more active RLC entities; and receiving a medium access control (MAC) control element (CE) comprising a plurality of fields for switching at least one of the one or more active RLC entities, excluding the RLC entity that is the primary path, to an inactive RLC entity.

In an implementation of the first aspect, the plurality of fields is further for switching at least one of the inactive RLC entities to an active RLC entity to switch an inactive transmission path to an active transmission path for sending duplicated PDCP PDUs.

In another implementation of the first aspect, the PDCP entity only generates duplicated PDCP PDUs for the active RLC entities.

An implementation of the first aspect further comprises: after receiving the MAC CE indicating switching the at least one active RLC entity to an inactive RLC entity, deactivating the at least one active RLC entity; and stop transmitting, by the PDCP entity, duplicated PDCP PDUs to the deactivated RLC entity.

In another implementation of the first aspect, the UE is configured with a plurality of dedicated radio bearers (DRBs) which is configured with the PDCP duplication function, wherein the received MAC CE comprises a field that has more than one bit and the value of the field is associated with one of the plurality of DRBs.

In another implementation of the first aspect, the plurality of DRBs is preconfigured by the base station via the downlink RRC signaling and each of the DRBs is configured with a unique ID (DRB ID).

In another implementation of the first aspect, the value of the field has a one on one mapping to an ID of a DBR (DRB ID) among the plurality of DRBs, in ascending or descending order.

In another implementation of the first aspect, the plurality of fields of the MAC CE comprises at least a first field for identifying the DRB associated with the MAC CE and at least a second field for indicating whether a corresponding RLC entity is active or inactive.

In another implementation of the first aspect, the MAC CE is identified by a header of a MAC subPDU having a specific logical channel identity (LCID).

In a second aspect of the present application, a UE comprising one or more non-transitory computer-readable media having computer-executable instructions for duplicating PDCP PDUs; and at least one processor is provided. The processor is coupled to the one or more non-transitory computer-readable media, and configured to execute the computer-executable instructions to: receive, from a base station, through RRC signaling, a configuration for a PDCP entity, the configuration indicating: (i) an association between the PDCP entity and a plurality of RLC entities; (ii) an RLC entity in the plurality of the RLC entities being a primary path; and (iii) one or more of the RLC entities as active RLC entities for transmitting duplicated PDCP PDUs; generate by the PDCP entity, one or more duplicated PDCP PDUs when a PDCP duplication function activation indicator is received; transmit, by the PDCP entity, the generated one or more duplicated PDCP PDUs to the one or more active RLC entities; and receive a medium access control (MAC) control element (CE) comprising a plurality of fields for switching at least one of the one or more active RLC entities, excluding the RLC entity that is the primary path, to an inactive RLC entity.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
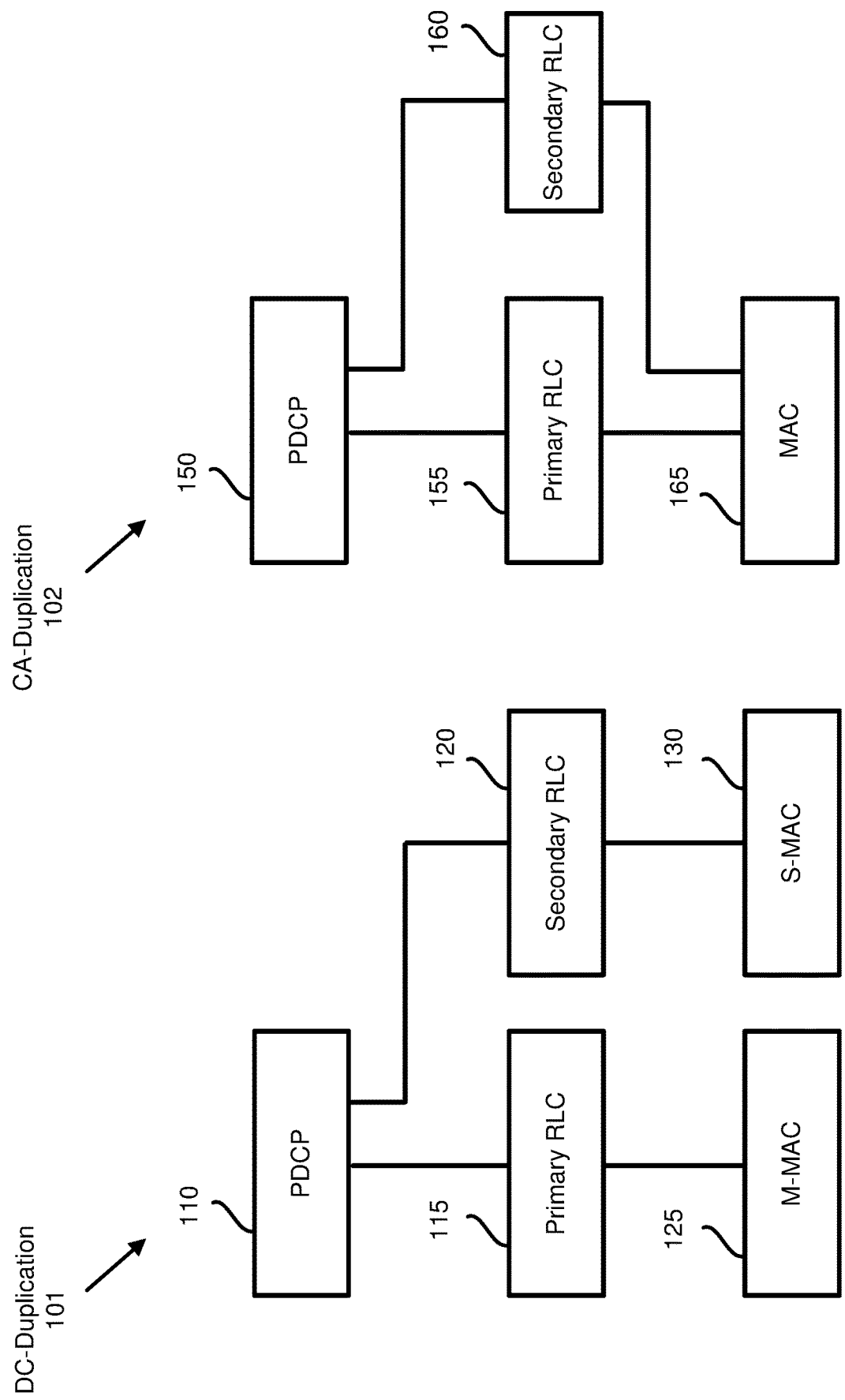
FIG. 1 is a diagram illustrating two PDCP duplication mechanisms for dual connectivity (DC) and carrier aggregation (CA) in radio access network (RAN), according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some of the present implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LIE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells. When the UE is configured with SCG, the UE may be configured with two MAC entities, one MAC entity for the MCG and one MAC entity for the SCG.

Additionally, for a UE that is capable of Carrier Aggregation (CA), two or more Component Carriers (CCs) may be aggregated with each other. Such a UE may simultaneously receive or transmit on one or multiple CCs depending on the UE's capabilities. CA is supported for both contiguous and non-contiguous CCs. When CA is deployed, frame timing and SFN are aligned across cells that can be aggregated.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

FIG. 1 is a diagram illustrating two PDCP duplication mechanisms for dual connectivity (DC) and carrier aggregation (CA) in radio access network (RAN), according to an example implementation of the present application. As shown in FIG. 1, in a DC-Duplication 101 mechanism, when the PDCP duplication is configured (e.g., through RRC signaling) for a radio bearer path including a PDCP entity 110, an RLC entity (e.g., a primary RLC entity) 115, and a MAC entity (e.g., a Master Cell Group-MAC (M-MAC) entity) 125, an additional RLC entity (e.g., a secondary RLC entity) 120 may be added (e.g., may be associated with the PDCP entity 110 which is configured with the PDCP duplication mechanism) in order for the radio bearer to handle the duplicated PDCP PDUs.

Similarly, in a CA-Duplication 102, when the PDCP duplication is configured for a radio bearer path including a PDCP entity 150, an RLC entity (e.g., a primary RLC entity) 155, and a MAC entity (e.g., an M-MAC entity) 165, an additional RLC entity (e.g., a secondary RLC entity) 160 may also be added (e.g., may be associated with the PDCP entity 150 which is configured with the PDCP duplication)

in order for the radio bearer to handle the duplicated PDCP PDUs. It should be noted that an RLC bearer may include the lower layer part of a radio bearer, which includes the association between the PDCP entity and an RLC entity, the RLC entity itself, and an associated logical channel (LCH) between the RLC entity and the MAC entity. An LCH between an RLC entity and a MAC entity may include a service access point associating the MAC entity to the RLC entity.

The duplication in the PDCP layer (e.g., the PDCP Duplication function) may include submitting the same PDCP PDUs to the lower layer twice, once on the primary RLC entity 115 or 155, and a second time on the additional RLC entity 120 or 160. In doing so, the two copies of the PDCP PDU (e.g., the original PDCP PDU and the corresponding duplicated PDCP PDU) may not be transmitted on the same carrier.

Logical channels of the two RLC bearers may either be associated with a single MAC entity (e.g., in the CA mechanism) or with different MAC entities (e.g., in the DC mechanism). The two MAC entities, in the DC mechanism, may be associated with two cell groups. One is for the Master CG (MCG) and another is for the Secondary CG (SCG). Hereinafter, the MAC which is associated with the MCG may be referred to as an M-MAC (e.g., the M-MAC entity 125), and the MAC which is associated with the SCG may be referred to as an S-MAC (e.g., (e.g., a Secondary Cell Group-MAC (S-MAC) entity 130). The PDCP duplication in the DC mechanism and the CA mechanism may be referred to as the DC-Duplication 101 and the CA-Duplication 102, respectively.

One of the two associated RLC bearers may be configured as a primary path (e.g., the primaryPath) for the PDCP PDU transmission, and the other RLC bearer may be configured as a secondary transmission path. The RLC entities of the primary and secondary transmission paths may be referred to as the primary RLC entity 115 (or 155) and the secondary RLC entity 120 (or 160), respectively. It should be noted that, the RLC entity associated with the MAC entity which is associated with the MCG is not restricted to be configured as the primary transmission path. The configurations of the primary transmission path and the MCG/SCG may be independently made by a base station (e.g., a gNB). The configuration received (e.g., from the base station) for a cell group may configure all the serving cell(s) to be served by the same MAC entity. Each of the RLC entities may be associated with one CG. Multiple RLC entities may belong to the same CG.

Some of the present implementations may provide a PDCP duplication mechanism with more than two duplication paths. That is, rather than limiting the PDCP duplication mechanism to be either a CA-Duplication or a DC-Duplication, the frequency diversity (e.g., typically gained from the CA mechanism) and spatial diversity (e.g., typically gained from the DC mechanism) may be jointly utilized in a more flexible manner by combining the CA and DC mechanisms.

Some of the present implementations provide a PDCP duplication mechanism, referred herein as the combined-duplication mechanism, which may combine the CA and DC duplication mechanisms. The features of the CA-Duplication may represent more than one RLC entity being associated with a PDCP entity. The associated RLC bearers may also be associated with the same MAC entity in some of the present implementations. The features of the DC-Duplication may represent, among all associated RLC bearers, at least one of the RLC bearers being associated with one MAC entity of the UE, and also at least one of the RLC bearers being associated with another MAC entity of the UE.

Once a PDCP entity is configured with the combined-duplication, multiple (e.g., at least three) RLC bearers may also be configured to associate with the PDCP entity. Among the associated RLC bearers, at least two of the RLC bearers may further be configured to associate with the same MAC entity, and the rest of the RLC bearers may be associated with another MAC entity. Although not shown in FIG. 2, some of the present implementations may provide a combined-duplication mechanism that has more than two MAC entities or has more than three RLC entities.

Figure 2:
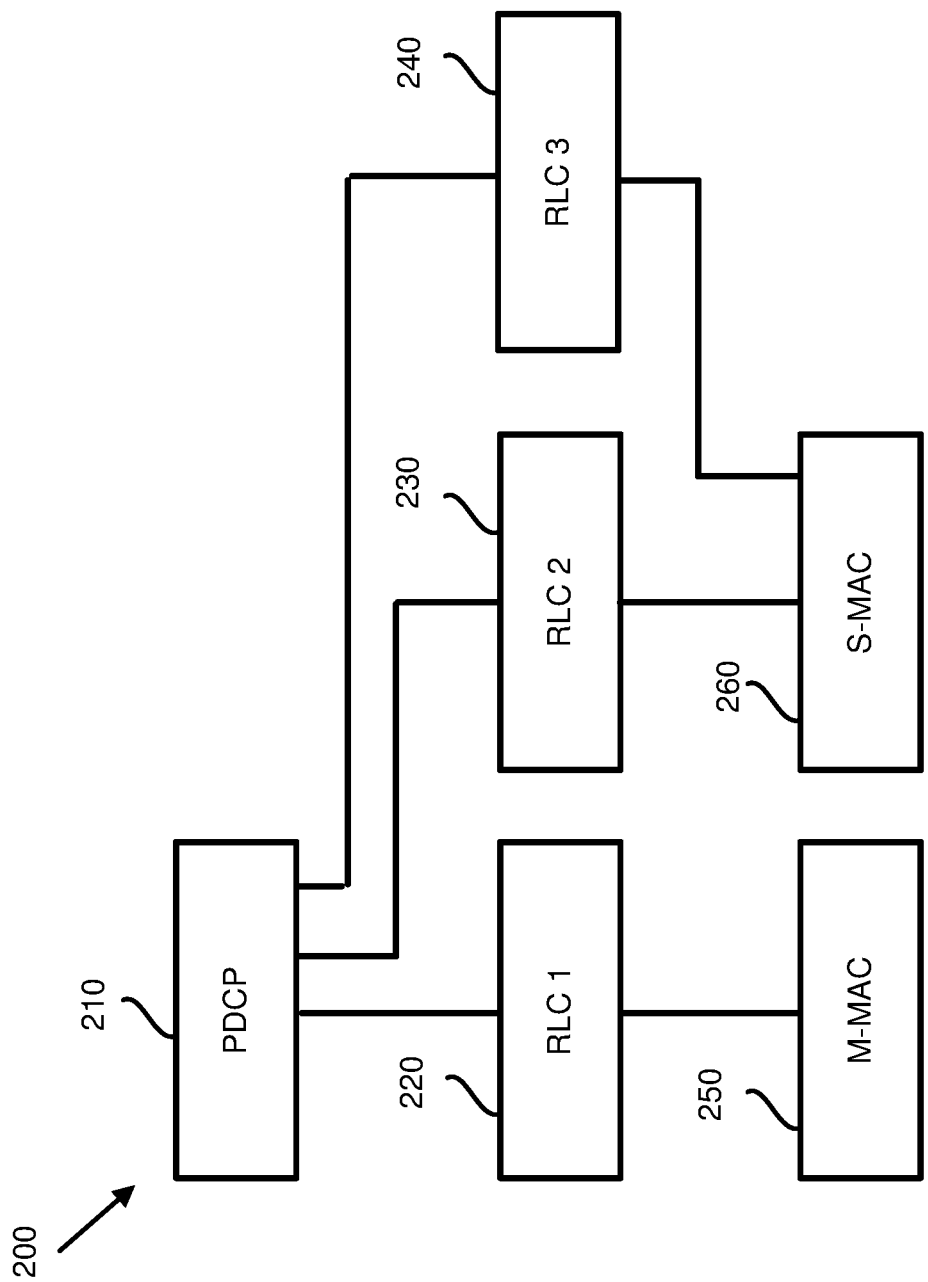
FIG. 2 is a diagram illustrating a PDCP duplication mechanism using a combined-duplication approach, according to an example implementation of the present application.

FIG. 2 is a diagram 200 illustrating a PDCP duplication mechanism using a combined-duplication approach, according to an example implementation of the present application. As shown in FIG. 2, a PDCP entity 210 may be configured with the combined-duplication and may be associated with three RLC entities 220, 330, and 240. The RLC entity 220 may be associated with an M-MAC entity 250, and the RLC bearers 230 and 240 may be associated with an S-MAC entity 260.

It should be noted that, FIG. 2 is just one example of the topology of a combined-duplication. The topology may also include the RLC entities 220 and 230 being associated with the M-MAC entity 250, and the RLC entity 240 being associated with the S-MAC entity 260. In addition, as mentioned above, the PDCP entity 210 may be associated with more than three RLC bearers, and/or the combined-duplication may configure a PDCP entity of a UE which is configured with multiple-connectivity (e.g., the UE may have been configured to have an RRC connections with more than two gNBs), or with multi-RAT dual connectivity (e.g., a dual connectivity between E-UTRA and NR nodes). In multiple-connectivity, the UE may be configured with more than two MAC entities, where each MAC entity may be for one RRC connection with one base station (e.g., a gNB or an eNB).

When the base station configures/reconfigures the UE's access stratum (AS) layer through a downlink RRC message, some PDCP entity related and RLC bearer related configuration(s) may be contained in the downlink RRC message. The downlink RRC message may include a configuration parameter, such as the RRCReconfiguration, RRCResume, RRCReestablishment, RRCSetup, or any unicast message. The PDCP related configuration may be contained within a PDCP entity specific information element (IE), such as the PDCP-Config parameter and the RLC bearer related configuration may be an RLC bearer specific IE, such as the RLC-BearerConfig parameter.

Figure 3:
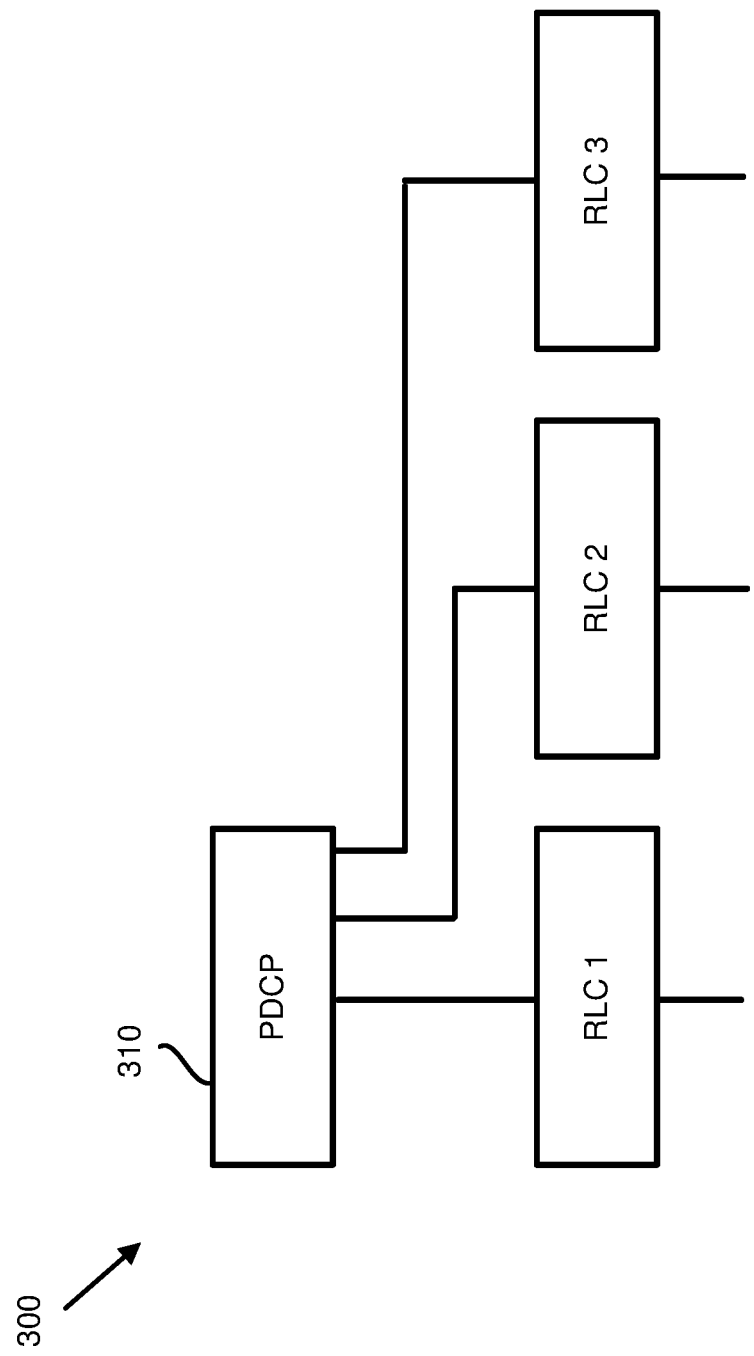
FIG. 3 is a diagram illustrating a PDCP entity associating with more than two RLC entities, according to an example implementation of the present application.

As discussed above, some of the present implementations may provide a combined-duplication mechanism that has more than two RLC bearers. FIG. 3 is a diagram 300 illustrating a PDCP entity that is associated with more than two RLC bearers, according to an example implementation of the present application. As shown in FIG. 3, a PDCP entity 310 is associated with three RLC entities, RLC 1, RLC 2, and RLC 3. Each of the three RLC entities may be associated with a MAC entity as well.

Some of the present implementations provide selection mechanisms for the PDCP PDU transmission paths. As discussed above, a PDCP entity of a UE may be configured with PDCP duplication by receiving the downlink RRC message transmitted by the base station. The PDCP entity may also be configured to be associated with one or more RLC bearer(s). In some of the present implementations, more than two RLC bearers may be configured (e.g., by the gNB) to be associated with a PDCP entity. For example, there may be a total of three RLC bearers configured by the gNB, via three RLC-Bearer-Config parameters, to be associated with the PDCP entity. In order to reduce the consumption of radio resources by the duplication, once the duplication function is activated, in some of the present implementations, the PDCP entity may not submit the same PDCP PDU to all of the associated (e.g., the three) RLC bearers (or RLC entities). Accordingly, only a specific number (e.g., NumofCopies) of the RLC bearers (e.g., two RLC bearers), among all of the associated RLC bearers (e.g., three RLC bearers), may be adopted to transmit the copies of the PDCP PDUs.

With reference to the example of FIG. 2, once the NumofCopies parameter is configured as two, and the duplication is activated, the PDCP entity may only transmit the same PDCP PDUs to two of the three RLC entities (e.g., two from all of the PDCP associated RLC entities). While considering the required reliability may be achieved by submitting PDCP PDUs to only two of all associated RLC entities (e.g., NumofCopies is configured as two), the consumption of the radio resource may be prevented from being linearly increased with the number of the associated RLC bearers.

In some of the present implementations, before receiving the NumofCopies configuration from the base station, the UE may report a NumofCopies_Cap IE to the base station (e.g., during the procedure of initial access or while in RRC connected state) via a specific uplink RRC message/IE that contains the NumofCopies_Cap. By reporting the NumofCopies_Cap IE, the UE may indicate to the base station the UE's capability on the maximum number of NumofCopies the UE may support. In other alternative implementations, the NumofCopies_cap may be per duplication mechanism type (e.g., CA-Duplication, DC-Duplication and/or combined-duplication), per RAT (e.g., NR, E-UTRAN, UTRAN), per number of connectivity (e.g., having RRC connection with two, three, or more gNB (or eNB or base station) at a time), or per type of radio bearer (e.g., the SRB or the DRB) reported. It should be noted that the duplication function may increase the power consumption of UE, and the UE may re-negotiate the NumofCopies (e.g., to reduce the maximum supporting number) accordingly to the UE's power condition or based on other criteria. Accordingly, the negotiation may not be restricted to the initial access stage.

Some of the present implementations may consider several factors to determine how the UE may make the Uplink transmission paths selection. For example, the selection of the transmission paths may partially or fully be made by the PDCP entity of the UE, or the selection may be instructed by the base station. Since loading, resource availability, and/or channel condition of the transmission path(s) may not be static, it may be advantageous to dynamically switch the transmission path(s). In addition, for a time period after the duplication is activated, the transmission path may not be indicated.

Some of the present implementations provide mechanisms for determining the default transmission path. Before the duplication is activated, the base station may explicitly or implicitly indicate the default transmission path(s) which may be applied by the PDCP entity once the duplication is activated (e.g., via one or more unicast RRC (re)configuration messages/signaling). Afterward, in some of such implementations, while the duplication function is operating (e.g., is activated), the base station may further indicate the transmission path(s) switching through the RRC and/or the lower layer (e.g., the physical (PHY) layer or the MAC layer) signaling. As mentioned above, in order to reduce the consumption of radio resources by the duplication, once the duplication function is activated, the PDCP entity may submit the same PDCP PDUs to only a specific number of the RLC entities. However, for a time period after the duplication is activated, the PDCP entity may not know the transmission path. Therefore, some of the present implementations may preconfigure a default (or initial) transmission path for the PDCP PDU submission in advance.

In some of the present implementations, the default transmission path may implicitly be determined by the UE. For example, the UE may select the default transmission path according to the LCID or the logical channel group (LCG) of the LCH that is offered by the MAC entity to the RLC entity associated with the PDCP entity. In one implementation, the PDCP entity may select the NumofCopies of the LCHs with the smallest, or the largest, value of the LCID. In another implementation, the PDCP entity may select the NumofCopies of the LCHs with the smallest or the largest LCID among the LCHs that are offered by a specific MAC entity (or belong to a specific cell group).

In one implementation, the PDCP entity may select the NumofCopies of the LCHs with the smallest or the largest value of the LCG ID. Alternatively, a combination of the implementations discussed above may be used. For example, there may be four LCHs (e.g., LCHs 1, 2, 3 and 4) configured by the base station to the MAC entity to offer to the four RLC entities, and all four RLC entities may be associated with the PDCP entity. The LCID of the LCHs 1, 2, 3, and 4 may be 1, 2, 3 and 4, respectively. For example, when the NumofCopies is configured as 2, and the rule for the PDCP entity to select the LCHs with the NumofCopies with the smallest LCID among the LCHs is applied, the LCH 1 and 2 may be selected.

In some of the present implementations, the default transmission path may also be explicitly indicated by a specific IE (e.g., DefaultPath), or by reusing the existing IE (e.g., as described in the TS 38.331 of the 3GPP, such as the moreThanOneRLC IE variable). In some of the present implementations, the default transmission path may be indicated by the DefaultPath IE, and the DefaultPath IE may be included in the existing moreThanOneRLC IE. In the Tables 1, 2, and 3 shown below, the cell group(s) and the logical channel(s) which are associated with the default transmission path(s) are indicated within the DefaultPath IE. In some of the present implementations, the cell group and the logical channel may be indicated via UE specific cell group ID (e.g., CellGroupID) and cell group specific logical channel ID (e.g., LogicalChannelIdentity), respectively.

TABLE 1

PDCP-Config information element

```
-- ASN1START
-- TAG-PDCP-CONFIG-START
PDCP-Config ::=          SEQUENCE {
  moreThanOneRLC              SEQUENCE {
    primaryPath                   SEQUENCE {
```

TABLE 1-continued

PDCP-Config information element

```
        cellGroup          CellGroupId              OPTIONAL, -- Need R
        logicalChannel     LogicalChannelIdentity   OPTIONAL -- Need R
    },
    DefaultPath            SEQUENCE {
        cellGroup          CellGroupId              OPTIONAL,
        logicalChannel     LogicalChannelIdentity   OPTIONAL
    },
    ul-DataSplitThreshold  UL-DataSplitThreshold    OPTIONAL, -- Cond SplitBearer
    pdcp-Duplication       BOOLEAN                  OPTIONAL -- Need R
} OPTIONAL. -- Cond MoreThanOneRLC
(Some IE(s) unrelated to the present implementations is skipped)
-- TAG-PDCP-CONFIG-STOP
-- ASN1STOP
```

In one implementation, as shown in Table 1, the default transmission path(s) may be the RLC entity(ies) with the logical channel(s) indicated by DefaultPath and primaryPath IEs. It should be noted that, there may be multiple DefaultPath IEs contained in the PDCP-Config IE, or multiple logical channels may be indicated by a single DefaultPath. IE. In the case of multiple DefaultPath. IEs, the base station may indicate one transmission path by one DefaultPath. IE in some of the present implementations. The base station may further list all DefaultPath IEs of each transmission path within a specific IE (e.g., TransPathToAddModList introduced in Table 3, below) in some of the present implementations. In other words, while configuring multiple DefaultPath IEs to the UE, each DefaultPath IE may indicate one RLC bearer, and all RLC bearers indicated by the multiple DefaultPath IEs may be considered as the default transmission path. In some of the present implementations, all default transmission paths may be used to submit the PDCP PDU(s), while the PDCP entity is submitting the PDCP PDU(s) after the PDCP duplication is activated.

some of the present implementations, a maxTransPath IE may be addressed to represent a possible maximum number of logical channels that are configured for a PDCP entity that is configured with PDCP duplication. The maxTransPath IE may be reported by the UE to the base station as a UE capability for the PDCP duplication.

It should be noted that, the UE may report a maxTransPath IE to the base station during the initial access procedure (or while in the RRC connected state) via a specific uplink RRC message/IE which contained the maxTransPath IE. By reporting the maxTransPath IE, the UE may indicate, to the base station, the UE's capability on the maximum number of transmission paths that the UE may support. In some alternative implementations, the maxTransPath IE may be per duplication mechanism type (e.g., the CA-Duplication, the DC-Duplication and/or the combined-duplication), per RAT (e.g., NR, E-U FRAN, UTRAN), per number of connectivity (e.g., having RRC connection with two, three, or more base stations (e.g., eNB) at a time), or per type of radio bearer (e.g., the SRB or the DRB) reported.

TABLE 2

PDCP-Config information element

```
-- ASN1 START
-- TAG-PDCP-CONFIG-START
PDCP-Config ::=            SEQUENCE {
moreThanOneRLC             SEQUENCE {
    primaryPath            SEQUENCE {
        cellGroup          CellGroupId              OPTIONAL, -- Need R
        logicalChannel     LogicalChannelIdentity   OPTIONAL -- Need R
    },
        TransPathToAddModList  SEQUENCE (SIZE(1 ..maxTransPath)) OF TransPath
OPTIONAL,
        TransPathToReleaseList SEQUENCE (SIZE(1..maxTransPath)) OF TransPath OPTIONAL,
    ul-DataSplitThreshold  UL-DataSplitThreshold    OPTIONAL, -- Cond SplitBearer
    pdcp-Duplication       BOOLEAN                  OPTIONAL -- Need R
    TransPath              SEQUENCE {
        cellGroup          CellGroupId              OPTIONAL,
        logicalChannel     LogicalChannelIdentity   OPTIONAL
    },
} OPTIONAL, -- Cond MoreThanOneRLC
(Some non-direct related IE(s) is skipped)
-- TAG-PDCP-CONFIG-STOP
-- ASN1STOP
```

In some of the present implementations, as shown in Table 2 below, the default transmission paths may include all RLC bearers associated with the logical channel(s) indicated by a TransPathToAddModList IE. The TransPathToAddModList IE may indicate a list of logical channels. Accordingly, there may be one or multiple logical channels that are indicated by the TransPathToAddModList IE. In addition, in The associated list of logical channels may also be removed/released from the default transmission paths by a TransPathToReleaseList IE which may indicate a list of configured logical channels. Once, the TransPathToReleaseList IE is received by the UE, the UE may consider removing the RLC bearers associated with the logical channels contained in the TransPathToReleaseList IE from the default transmission paths. The logical channels indicated by either the TransPathToAddModList IE or the TransPathToReleaseList IE may further be contained/configured through a specific IE (e.g., TransPath). Logically similar as the design for the primaryPath IE, the TransPath IE may indicate the CellGroupID and the LogicalChannelIdentity, respectively. The TransPath IE may be contained in the PDCP-Config, moreThanOneRLC, or some other IEs. In another implementation, the TransPath IE may be replaced by the DefaultPath IE, and may be included in the TransPathToAddModList IE and/or TransPathToReleaseList IE.

TABLE 3

RLC-BearerConfig information element

ASN1START
-- TAG-RLC-BEARERCONFIG-START
RLC-BearerConfig ::=         SEQUENCE {
    logicalChannelIdentity       LogicalChannelIdentity,
    servedRadioBearer            CHOICE {
        srb-Identity             SRB-Identity,
        drb-Identity             DRB-Identity
    } OPTIONAL, - Cond LCH-SetupOnly
        DefaultLCH                          ENUMERATED {true},
    mac-LogicalChannelConfig         LogicalChannelConfig OPTIONAL, -- Cond
LCH-Setup
    ...
}
(Some non-direct related IE(s) is skipped)
-- TAG-RLC-BEARERCONFIG-STOP
-- ASN1STOP In some of the present implementations, the default transmission paths may also be indicated by the RLC bearer related configuration LE (e.g., the RLC-BearerConfig IE). For example, as shown in Table 3 above, while configuring the corresponding logical channel via the RLC-BearerConfig, the base station may further indicate whether the RLC bearer is considered as the (default) transmission path by a specific IF: (e.g., DefaultLCH) contained in the RLC-BearerConfigIE. Accordingly, only the RLC bearer(s) indicated by the DefaultLCH IE (e.g., indicated as true within the field) may be considered as default transmission path. In some other implementations, the default transmission paths may also be indicated by a RLCBearerPair IE (e.g., the RLC Bearer Pair ID). In other words, within the DefaultLCH, TransPath or DefaultPath introduced as above, the base station may indicate the default transmission path via the RLCBearerPair or the RLC Bearer ID instead of the CellGroupID or the LogicalChannelIdentity. The RLCBearerPair and the RLC Bearer ID is described below. In some of the present implementations, the transmission path that belong to a specific cell group (e.g., the master cell group or the secondary cell group) may be implicitly indicated/considered as the default transmission path.

Some of the present implementations provide a mechanism for the fully flexible dynamic switching of the transmission path that is indicated by the base station. Before the PDCP duplication is activated, the PDCP entity may be configured to be associated with multiple RLC bearers, but only some of the associated RLC bearers may be indicated as the default transmission path (e.g., as described above), which can be applied immediately after the activation of the PDCP duplication. The transmission path may then be switched among the multiple associated RLC bearers (e.g., while the duplication is activated). Accordingly, once the PDCP duplication is activated, only the specific pre-indicated RLC bearers may be applied by the PDCP entity as the transmission path.

However, since the loading, resource availability, and/or channel condition of each of the transmission path(s) or transmission path pair may not be static, the transmission path may be further dynamically switched by receiving downlink signaling from the base station. The downlink signaling may be the RRC, the MAC, and/or the PHY layer(s) signaling. Some of the present implementations provide several alternatives on how the transmission path may be switched, as describe below.

During the RRC (re)configuration (e.g., the RLC entity (re)configuration or the PDCP entity (re)configuration), the base station may pair all or part of the configured RLC bearers into several RLC bearer pairs. After the PDCP duplication is activated, the transmission paths may be dynamically switched on per RLC bearer pair basis. Accordingly, once a specific downlink signaling is received from the base station, the UE may switch the transmission path from one RLC bearer pair to another RLC bearer pair based on a pre-defined switching rule or the indication within the downlink signaling. The base station pairing of the RLC bearers is described below.

The base station may indicate a Pair Index for each configured RLC bearer through a specific IE (e.g., RLC-BearerPair). In other words, according to the base station's configuration/indication, a configured RLC bearer may belong to zero, one, or more RLC bearer pairs. The specific IE may be contained in the RLC-BearerConfig, PDCP-config or LogicalChannelConfig parameters.

As the shown below in the example in Table 4, while configuring an RLC bearer, the base station may indicate to which of the RLC bearer pairs the configuring RLC bearer may belong. The RLCBearerPair IE may indicate an ID (e.g., the RLC Bearer Pair ID) of the RLC bearer pair to which the RLC bearer belongs. In addition, a maxRLCBearerPair parameter may be applied to represent a maximum number of RLC bearer pairs that the UE is (or may be) configured for a PDCP entity configured with PDCP duplication. The maxRLCBearerPair may be reported by the UE to the base station as a UE capability for the PDCP duplication. Similar to what is shown in Table 4, the RLCBearerPair IE may also be included in some other IEs such as the PDCP-config IE or the LogicalChannelConfig

TABLE 4

RLC-BearerConfig information element

```
ASN1START
-- TAG-RLC-BEARERCONFIG-START
RLC-BearerConfig ::=           SEQUENCE {
    logicalChannelIdentity         LogicalChannelIdentity,
    servedRadioBearer              CHOICE {
        srb-Identity               SRB-Identity,
        drb-Identity               DRB-Identity
            RLCBearerPair          INTEGER (0..maxRLCBearPair)
    } OPTIONAL, - Cond LCH-SetupOnly
    RLCBearerPair                  INTEGER (0..maxRLCBearPair)
    mac-LogicalChannelConfig       LogicalChannelConfig OPTIONAL, -- Cond
LCH-Setup
    ...
}
(Some IE(s) not related to the present implementations is skipped)
-- TAG-RLC-BEARERCONFIG-STOP
-- ASN1STOP
```

The UE may report a maxRLCBearerPair LE to the base station during the procedure of initial access (or while in the RRC connected state) via a specific uplink RRC message/IE, which is included in the maxRLCBearerPair. By reporting the maxRLCBearerPair IE, the UE may indicate, to the base station, the UE's capability on the maximum number of RLC bearer pairs that the UE may support. In some of the present implementations, the maxRLCBearerPair IE may be per duplication mechanism type (e.g., CA-Duplication, DC-Duplication, and/or combined-duplication), per RAT (e.g., NR, E-UTRAN, UTRAN), per number of connectivity (e.g., having RRC connection with two, three, or more base stations (e.g., eNBs) at a time), or per type of radio bearer (e.g., the SRB or the DRB) reported.

After the RLC bearer pair is configured and the PDCP duplication is activated, the base station may indicate the UE to perform transmission path(s) switching via a specific type of MAC CE which may be multiplexed into a downlink MAC PDU transmitted from the base station to the UE via any serving cell. The specific MAC CE may be the Transmission Path Switching (TPS) MAC CE. For example, when two pairs of RLC bearers (e.g., RLC Bearer Pair 0 and RLC Bearer Pair 1) are configured to associate with the PDCP entity for the PDCP duplication, and the RLC Bearer Pair 0 is configured as the default transmission path, once the PDCP duplication is activated, the PDCP may apply the RLC Bearer Pair 0 to transmit PDCP PDUs. However, if a TPS MAC CE is received that indicates a switching from the RLC Bearer Pair 0 to the RLC Bearer Pair 1, the PDCP entity should stop applying the RLC Bearer Pair 0 for the PDCP PDU transmission and should apply the RLC Bearer Pair 1 for the PDCP PDU transmission. In the example mentioned above, the RLC bearer pair switching behavior may be implemented as deactivating the RLC Bearer Pair 0 and then activating the RLC Bearer Pair 1.

Figure 4:
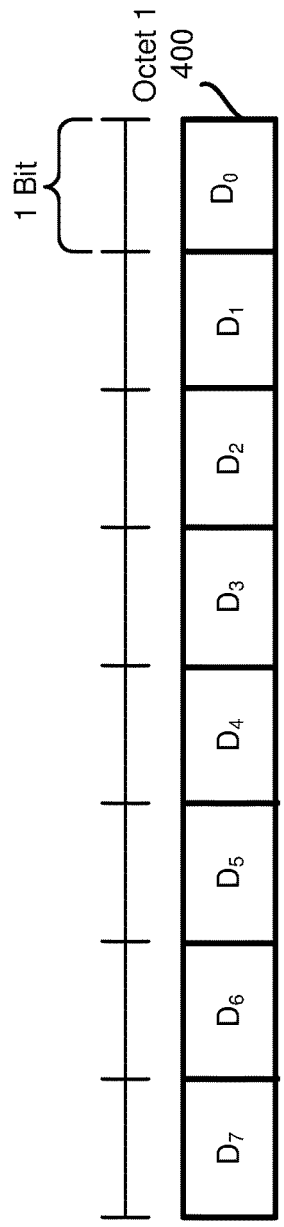
FIG. 4 is a diagram illustrating a MAC CE format/structure for (re)configuring one or more transmission paths on a PDCP entity, according to an example implementation of the present application.

In some of the present implementations, the number of RLC bearer pair configured for each of PDCP entity may be a fix constant (e.g., two), the TPS MAC CE may be a bit string that is byte aligned (e.g. multiple of 8 bits) in length. FIG. 4 is a diagram illustrating a MAC CE format/structure for (re)configuring one or more transmission paths on a PDCP entity, according to an example implementation of the present application. As shown in FIG. 4, the TPS MAC CE of one octet 400 is identified by a header of MAC subPDU with a specific LCID. The TPS MAC CE has a fixed size and includes a single octet 400 containing eight D-fields, $D_0$-$D_7$.

The TPS MAC CE for a MAC entity, in some of the present implementations, may be defined as follows. The $D_i$ field may indicate the activation/deactivation status of the RLC Bearer Pair associated with the PDCP duplication of the Data Radio Bearer i (DRB i), where i is the ascending/descending order of the DRB ID among the DRBs configured with PDCP duplication and with RLC entity(s) associated with the UE's MAC entity.

The $D_i$ field may be set to zero to indicate that the RLC Bearer Pair 0 of the PDCP duplication of DRB i shall be activated and the RLC Bearer Pair 1 of the PDCP duplication of DRB i shall be deactivated. The $D_i$ field may be set to one to indicate that the RLC Bearer Pair 1 of the PDCP duplication of DRB i shall be activated and the RLC Bearer Pair 0 of the PDCP duplication of DRB i shall be deactivated. In other words, the PDCP may apply the RLC Bearer Pair 0 as transmission path to transmit the PDCP PDU if the corresponding $D_i$ field is set to zero, and apply the RLC Bearer Pair 1 as transmission path to transmit the PDCP PDU if the corresponding $D_i$ field is set to one.

In some of the present implementations, only two of the RLC bearers, among all RLC Bearers associated with the PDCP entity, may be configured as an RLC Bearer Pair, the rest of the RLC bearer(s) may not be configured to belong to any RLC Bearer Pair. The PDCP may not apply the RLC Bearer Pair as the transmission path to transmit the PDCP PDU if the corresponding Di field is set to zero, and the PDCP should apply the RLC Bearer Pair as the transmission path to transmit the PDCP PDU if the corresponding $D_i$ field is set to one. In some of the present implementations, the $D_i$ filed may be set to zero to indicate that the PDCP should apply the default RLC bearer(s) or the default RLC bearer pair as the PDCP PDU transmission path. The $D_i$ field may be set to one to indicate the PDCP should not apply the default RLC bearer(s) or default RLC bearer pair as the PDCP PDU transmission path.

Figure 5:
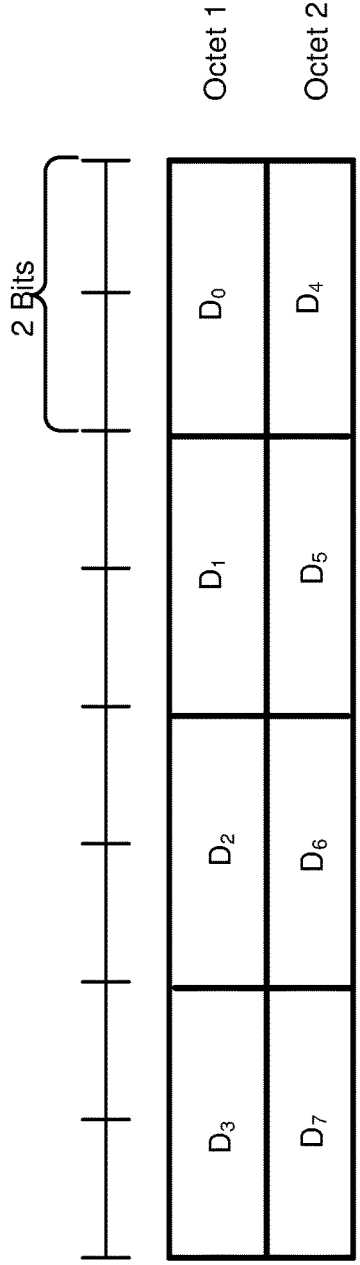
FIG. 5 is a diagram illustrating a MAC CE format/structure for (re)configuring one or more transmission paths on a PDCP entity, according to an example implementation of the present application.

In some of the present implementations, the size of the TPS MAC CE may depend on the number of the RLC bearer pairs configured for each PDCP entity (duplication function) of the DRB and the number of PDCP entities (duplication function) of the DRB that may support more than two transmission paths configurations/operations within the UE. FIG. 5 is a diagram illustrating a MAC CE format/structure for (re)configuring one or more transmission paths on a PDCP entity, according to an example implementation of the present application. The TPS MAC CE is a bit string that is byte aligned (e.g. multiple of 8 bits) as shown in the FIG. 5.

In the example of FIG. 5, the UE may support up to 8 PDCP entities (duplication function) of the DRB that can support more than two transmission path configurations/operations. The PDCP entity (duplication function) of the DRB may be configured with four RLC Bearer Pairs and each $D_0$-$D_7$ field in FIG. 5 may have 2 bits.

The $D_i$ field may indicate the activation/deactivation status of the RLC Bearer Pair associated with the PDCP duplication of Data Radio Bearer i (DRB i), where i is the ascending/descending order of the DRB ID among the DRBs configured with the PDCP duplication and with the RLC entity(s) associated with the UE's MAC entity. The $D_i$ field may be set to x to indicate that the RLC Bearer Pair x of the PDCP duplication of DRB i shall be activated and the rest of the configured/associated RLC Bearer Pairs of the PDCP duplication of the DRB i shall be deactivated.

The number of bits of each $D_i$ field may depend on the number of the RLC bearer pairs configured for each PDCP entity (duplication function) of the DRB. For example, the $D_i$ may be a three-digit field, if the number of RLC bearer pair configured for each PDCP entity (duplication function) of the DRB is set to eight. The number of $D_i$ fields included in the TPS MAC may also depend on the number of the PDCP entities (duplication function) of the DRB that can support more than two transmission path configurations/operations within the UE. Therefore, the format of the TPS MAC CE may be similar to the format shown in FIG. 5, with the difference that each of the D fields may contain 3, 4, or more bits.

It should be noted that the format should be predetermined/predefined and not dynamically decided by the base station. Some reserved bits may also be included in the TPS MAC CE for byte alignment. Each format (e.g., the number of bits of the Di field) of the TPS MAC CE may be distinguish by the LCID within the header of MAC subPDU of the TPS MAC CE. Alternatively, the base station may apply only one format for the TPS MAC CE for the UE. For example, the $D_i$ field of the TPS MAC CE may always be two bits. As a result, the maximum number of the RLC bearer/RLC bearer pairs supported by a UE may be 4. However, for a PDCP entity that is only configured with 2 RLC bearer pairs, the base station may indicate the first pair by configuring the corresponding $D_i$ as 00, and may indicate the second pair by configuring the corresponding $D_i$ as 01.

Moreover, in one implementation, a pre RRC signaling exchange between the UE and the base station may be applied before the PDCP duplication is configured/activated to negotiate the format of the TPS MAC CE that should be applied. In another implementation, the UE may implicitly apply the corresponding format of the TPS MAC CE according to the maximum number of the RLC bearer/RLC bearer pairs that the UE has reported, or according to the number of the RLC bearer/RLC bearer pairs that the base station configures to a PDCP entity.

For some implementations, such as the implementation shown in FIG. 2, the $D_i$ field may indicate the activation/deactivation status of the RLC Bearer Pair associated with the PDCP duplication of the Data Radio Bearer i (DRB i), where i may be the ascending/descending order of the DRB ID among the DRBs configured with PDCP duplication and with RLC entity(s) associated with the UE's MAC entity.

The $D_i$ field may be set to x to indicate that the RLC Bearer Pair x of PDCP duplication of DRB i shall be activated and the rest of configured/associated RLC Bearer Pairs of the PDCP duplication of DRB i shall be deactivated. The number of bits of each $D_i$ field may depend on the number of the RLC bearer pairs configured for each PDCP entity (duplication function) of the DRB. For example, the $D_i$ should be a three digits field if the number of the RLC bearer pairs configured for each of PDCP entity (duplication function) of the DRB is set to eight. The number of $D_i$ fields contained in the TPS MAC may also depend on the number of the PDCP entities (duplication function) of the DRB that can support more than two transmission path configurations/operations within the UE. Some reserved bits may also be included in the TPS MAC CE for byte alignment.

Figure 6:
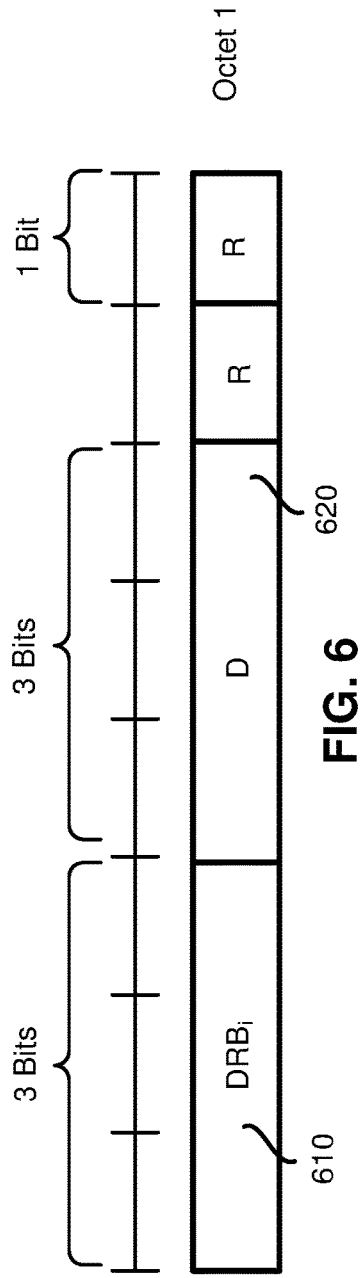
FIG. 6 is a diagram illustrating a MAC CE format/structure for (re)configuring one or more transmission paths on a PDCP entity and identifying a DRB associated with the MAC CE, according to an example implementation of the present application.

In some of the present implementations, the TPS MAC CE may include a $DRB_i$ field that may indicate a DRB that may require switching the RLC Bearer Pair. FIG. 6 is a diagram illustrating a MAC CE format/structure for (re) configuring one or more transmission paths on a PDCP entity, according to an example implementation of the present application. A $DRB_i$ field 610 may indicate the DRB ID directly, or i may represent the ascending/descending order of the DRB ID among the DRBs configured with PDCP duplication and with RLC entity(s) associated with the UE's MAC entity.

For example, the DRB field set to 000 may be associated with a DRB with smallest value of DRB ID for which the corresponding PDCP entity may be configured with a PDCP duplication function, and the DRB field set to 001 may be associated with a DRB with second smallest value of DRB ID for which the corresponding PDCP entity may be configured with a PDCP duplication function. In another example, the DRB field set to 000 may be associated with a DRB with the largest value of DRB ID for which the corresponding PDCP entity may be configured with a PDCP duplication function, and the DRB field set to 001 may be associated with a DRB with the second largest value of DRB ID for which the corresponding PDCP entity may be configured with a PDCP duplication function. A "D" field 620 may indicate the activation/deactivation status of the RLC Bearer or the RLC Bearer Pair associated with the PDCP duplication of the DRB indicated by the DRBi. The D field 620 may indicate which RLC bearer should be activated, and it may also indicate that the RLC bearer that is not indicated should be deactivated. Some reserved bits may also be included in the TPS MAC CE for byte alignment.

Some of the implementations described above may be applied to the implementation of FIG. 6. For example, depending on the number of the RLC bearers and/or RLC bearer pairs that are configured for each PDCP entity (duplication function) of the DRB and the number of the PDCP entity (duplication function) of DRB that can support more than two transmission path configurations/operations within the UE, the size of the DRBi and the size of the D may vary.

It should be noted that some or all formats of the TPS MAC CE may simultaneously be supported and may be identified by the UE via different LCIDs which are included in the MAC subheader of the TPS MAC CE. It should also be noted that the D field of FIGS. 4, 5 and 6 may be represented as the activation/deactivation status of an RLC bearer of a PDCP duplication. For example, in FIG. 4, i is the ascending/descending order of the LCIDs of the LCHs that are configured for a radio bearer that is configured with the PDCP duplication. The $D_i$ field may be set to zero to indicate that the corresponding RLC Bearer of PDCP duplication shall be deactivated, the $D_i$ field may be set to one to indicate that corresponding RLC Bearer of PDCP duplication shall be activated.

In this example, the radio bearer may be indicated by the subheader of the MAC CE. For example, in FIG. 5, i may be the ascending/descending order of the DRB ID among the DRBs that are configured with the PDCP duplication and with the RLC entity(s) associated with the UE's MAC entity. Among all associated RLC bearers of the PDCP entity of a DRB, the RLC bearer (pair) associated with an LCH with the smallest LCID may be activated if the corresponding $D_i$ is set to 00, and the remaining RLC bearer may be deactivated (except for the default/mandatory path). Among all associated RLC bearers of the PDCP entity of a DRB, the RLC bearer (pair) associated with an LCH with the second smallest LCID may be activated if the corresponding $D_i$ is set to 01, and the remaining RLC bearer(s) may be deactivated (except for the default/mandatory path), etc.

For example, in FIG. 6, the DRBi field 610 may indicate the DRB ID directly, or i may represent the ascending/descending order of the DRB ID among the DRBs configured with the PDCP duplication and with the RLC entity(s) associated with the UE's MAC entity. The D field 620 may indicate the activation/deactivation status of the RLC Bearer associated with PDCP duplication of the DRB indicated by the DRBi. Among all associated RLC bearers of the PDCP entity of a DRB, the RLC bearer (pair) associated with an LCH with the smallest LCID may be activated if the corresponding $D_i$ is set to 00, and the remaining RLC bearer(s) may be deactivated (except, in some implementations, for the default/mandatory path). Among all associated RLC bearers of the PDCP entity of a DRB, the RLC bearer (pair) associated with a LCH with the second smallest LCID may be activated if the corresponding $D_i$ is set to 01, and the remaining RLC bearer(s) (besides the RLC bearers indicated by the TPS MAC CE) may be deactivated (except or not except, in some implementations, for the default/mandatory).

Figure 7:
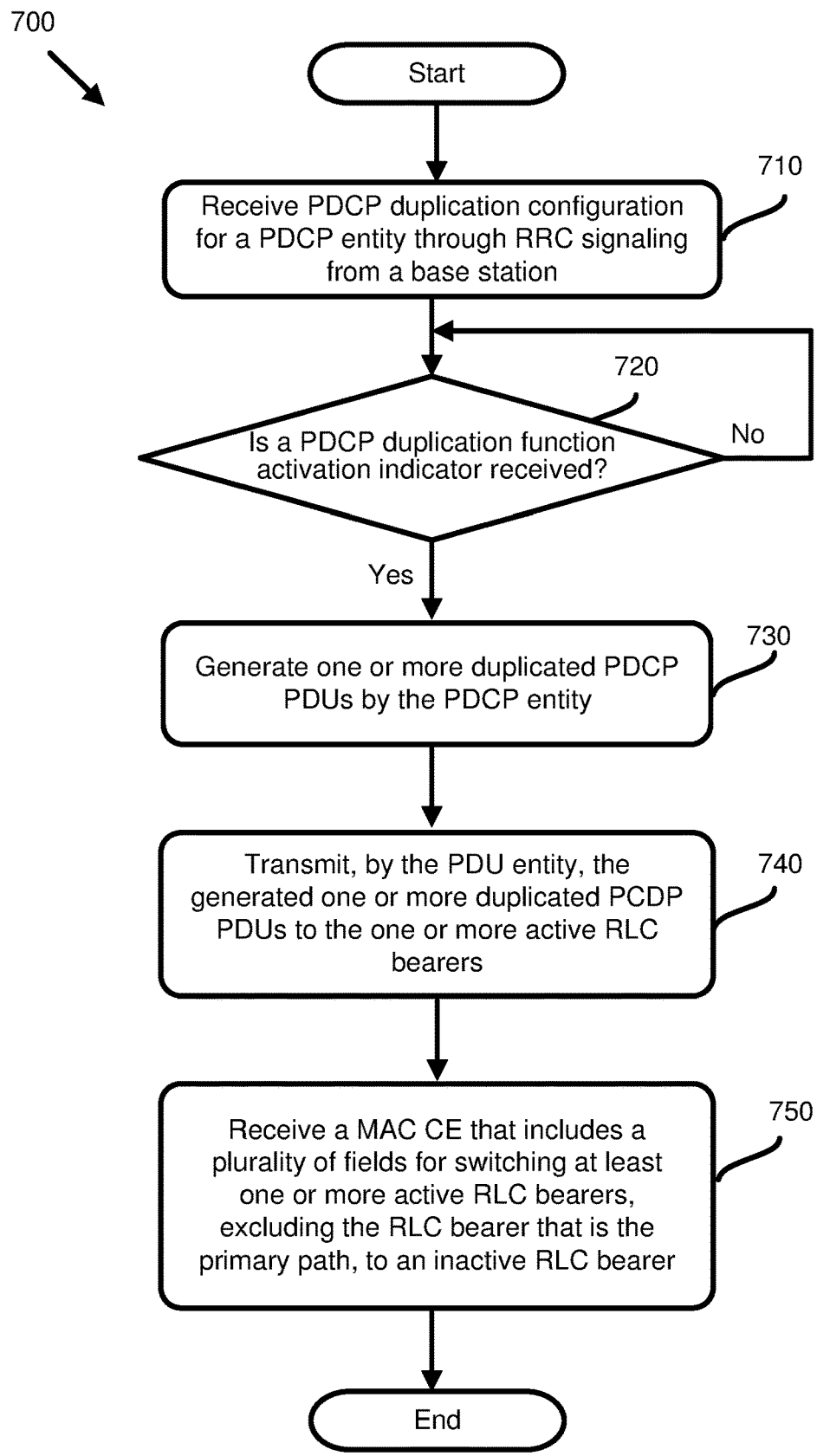
FIG. 7 is a flowchart illustrating a method (or process) performed by a UE for PDCP duplication, according to an example implementation of the present application.

FIG. 7 is a flowchart illustrating a method (or process) 700 performed by a UE for PDCP duplication, according to an example implementation of the present application. The process 700 may be performed by a controller, such as a processor or a microcontroller of a UE. The process 700 may start in action 710 by receiving a PDCP duplication configuration for a PDCP entity from a base station through RRC signaling. The configuration may indicate an association between the PDCP entity and a plurality of radio link control (RLC) bearers. The configuration may further indicate an RLC bearer (or entity) in the plurality of the RLC bearers (or entities) as being a primary path. The configuration may also indicate one or more of the RLC bearers (or entities) as the active RLC bearers (or entities) for transmitting duplicated PDCP PDUs. The active RLC bearers may include the RLC bearers that are not indicated as the primary path.

The process 700, in action 720, may determine whether a PDCP duplication function activation indicator is received. When the process 700 determines that a PDCP duplication function activation indicator is not received, the process 700 may proceed back to action 720 to wait for the PDCP duplication function activation indicator. In one example, the activation indicator in action 720 may be included in the PDCP duplication of action 710. In another example, the activation indicator in action 720 may be a specific which may indicate an initial state of the PDCP duplication function as activated and the indicator may be included in the PDCP duplication of action 710.

Otherwise, when the process 700 determines that a PDCP duplication function activation indicator is received, the process 700, in action 730, may generate one or more duplicated PDCP PDUs by the PDCP entity. The process 700, in action 740, may transmit, by the PDCP entity, the generated one or more duplicated PDCP PDUs to the one or more active RLC bearers (or entities).

The process 700, in action 750 may receive a MAC CE that comprises a plurality of fields for switching at least one of the one or more active RLC bearers (or entities) to an inactive RLC bearer (or entity), excluding the RLC bearer that is the primary path.

In some of the present implementations, the process 700 may, after receiving the MAC CE that indicates switching the at least one active RLC bearer to an inactive RLC bearer, deactivate the at least one active RLC bearer, and may stop transmitting, by the PDCP entity, the duplicated PDCP PDUs to the deactivated RLC bearer. By doing so, in some of the present implementations, the process 700 may switch an inactive transmission path (e.g., including the transport channel (the channel between a PDCP entity and an RLC entity), an associated inactive RLC entity, and an associated logical channel (the channel between the RLC entity and a MAC entity)) to an active transmission path for sending the duplicated PDUs In some of the present implementations, the plurality of fields may be further used for switching at least one of the inactive RLC bearers to an active RLC bearer. In some of the present implementations, the PDCP entity may only generate the duplicated PDCP PDUs for the active RLC bearers. In some of the present implementations, the UE may be configured with a plurality of DRBs which is configured with the PDCP duplication function. The received MAC CE may comprise a field that has more than one bit and the value of the field may be associated with one of the plurality of DRBs.

In some of the present implementations, the value of the field may have a one on one mapping to an ID of a DBR among the plurality of DRBs, in ascending or descending order. In some of the present implementations, the plurality of fields of the MAC CE may comprise at least a first field for identifying the DRB associated with the MAC CE and at least a second field for indicating whether a corresponding RLC bearer is active or inactive. In some of the present implementations, the MAC CE may be identified by a MAC PDU subheader that has a specific LCID.

Some of the present implementations provide a mechanism for a partially flexible switching of the transmission path that is indicated by the base station (e.g., the gNB). In these implementations, a transmission path or part of a transmission path may be fixed. Similar to the dynamic transmission path switching mechanisms introduced above, the transmission path may be partially switched. During the RRC (re)configuration (e.g., during the RLC bearer (re)configuration or the PDCP entity (re)configuration), the base station may further indicate that one or more of the configured/associated RLC bearers is a mandatory transmission path. After the mandatory transmission path is configured and the PDCP duplication is activated, the base station may only indicate the UE to perform non-mandatory transmission path(s) switching via a the TPS MAC CE.

For example, there may be three RLC bearers (e.g., RLC Bearer 0, 1 and 2) configured to associate with the PDCP entity for the PDCP duplication, and the RLC Bearer 0 may be configured as the mandatory transmission path. Once the PDCP duplication is activated, the PDCP may apply the RLC Bearer 0 and another pre-indicated RLC bearer (e.g., RLC bearer 1) to transmit PDCP PDUs. However, if a TPS MAC CE is received that indicates switching from the RLC Bearer 1 to the RLC Bearer 2, the PDCP entity should stop applying the RLC Bearer 1 for the PDCP PDU transmission and should apply the RLC Bearer 2 for the PDCP PDU transmission while keeping the RLC bearer 0 as the transmission path.

Similar to what is shown in Table 1 and/or Table 3 above, the mandatory transmission path may be indicated with a specific IE (e.g., the MandatoryPath) which includes the CellGroupID and the LogicalChannelIdentity for indicating the cell group and the logical channel, respectively. In another implementation, the mandatory transmission path may also be indicated by reusing the DefaultPath introduced in Table 1 and/or the TransPath introduced in Table 2, and/or the DefaultLCH introduced in Table 3, and/or the primaryPath introduced in the NR PDCP duplication.

In some of the present implementations, the TPS MAC CE introduced in FIGS. 4, 5 and 6 may be applied by the base station to indicate whether another RLC bearer (pair) should be applied as transmission path in addition to the mandatory transmission path. For example, as shown in FIG. 4, the TPS MAC CE of one octet 400 may be identified by a MAC PDU subheader with a specific Logical Channel Identity (LCID). It has a fixed size and includes a single octet with eight D-fields. The TPS MAC CE may be defined for a MAC entity as follows.

The $D_i$ field may indicate the activation/deactivation status of the RLC Bearer Pair associated with PDCP duplication of Data Radio Bearer i (DRB i), where i is the ascending/descending order of the DRB ID among the DRBs configured with PDCP duplication and with RLC entity(s) associated with the UE's MAC entity. The $D_i$ field may be set to zero to indicate that the RLC Bearer Pair 0 of PDCP duplication of DRB i shall be activated and the RLC Bearer Pair 1 of PDCP duplication of DRB i shall be deactivated. The Di field may be set to one to indicate that the RLC Bearer Pair 1 of PDCP duplication of DRB i shall be activated and the RLC Bearer Pair 0 of PDCP duplication of DRB i shall be deactivated. In other words, the PDCP may apply the RLC Bearer Pair 0 as the transmission path to transmit the PDCP PDU if the corresponding $D_i$ field is set to zero, and may apply the RLC Bearer Pair 1 as the transmission path to transmit the PDCP PDU if the corresponding $D_i$ field is set to one.

As shown in FIG. 6, the TPS MAC CE may contain a DRBi field 610 that may indicate a DRB may require to switch the RLC Bearer Pair. The DRBi field may indicate the DRB ID directly, or i may represent the ascending/descending order of the DRB ID among the DRBs configured with PDCP duplication and with RLC entity(s) associated with the UE's MAC entity. The D field 620 may indicate the activation/deactivation status of the RLC Bearer Pair associated with the PDCP duplication of the DRB indicated by the DRBi. Some reserve bits may be included in the TPS MAC CE for byte alignment. Some of the mechanisms described above may also be applied to this implementation. For example, depending on the number of the RLC bearer pairs configured for each of PDCP entity (duplication function) of DRB and the number of PDCP entity (duplication function) of the DRB that can support more than two transmission path configurations/operations within the UE, the size of the DRBi and the size of the D may vary.

In some of the present implementations, the mandatory transmission path may belong to a specific cell group (e.g., the master cell group or the secondary cell group) that may be implicitly indicated/considered as the mandatory transmission path. It should be noted that, the implementations discussed above may also be done by using the NumofCopies parameter described above. A UE's PDCP entity may be configured with PDCP duplication and the NumofCopies by receiving the downlink RRC message transmitted by the base station. The PDCP entity may also be configured for association with the corresponding RLC bearer(s). While the duplication is activated, the PDCP entity should only submit the PDCP PDU(s) to NumofCopies of the associated RLC entities among the transmission path (e.g., the RLC bearer(s) or the RLC entity(s)) indicated/determined following the implementations described above.

It is also noted that, the TPS MAC CE introduced in FIGS. 4, 5, and 6 may also be implemented as follows. After the PDCP duplication related configuration is configured and while the PDCP duplication is not activated, the TPS MAC CE introduced in FIGS. 4, 5, and 6 may be applied by the base station to indicate the UE to activate the PDCP duplication (of a radio bearer), and to apply the transmission path(s) indicated by the TPS MAC CE as transmission path.

Some of the present implementations may provide a two-stage duplication activation and deactivation. As mentioned above, in order to achieve higher reliability (e.g., on the data packet transmission for the URLLC service), the PDCP duplication with more than two duplication paths (e.g., RLC bearers) may be introduced by 3GPP for the NR. However, the PDCP entity may not always be required to apply multiple configured/associated RLC bearers.

Considering that the loading, resource availability, and/or channel condition of each transmission path(s) may not be static, it is advantageous to have a proper mechanism to let the base station control the PDCP duplication operation to switch between two transmission path (e.g., as the NR PDCP duplication) and more than two transmission paths. For example, by following the NR PDCP duplication activation and deactivation mechanism explained in the Technical Specification 38.321 of 3GPP, the base station may activate and deactivate the PDCP duplication function of the DRB by a "Duplication Activation/Deactivation MAC CE."

If the reliability cannot be achieved even after the duplication is activated, the base station may further activate more RLC bearer(s) as transmission paths of the PDCP duplication function via another specific MAC CE following some pre-defined/pre-configured configuration and/or rule(s). That is, the PDCP entity may only apply some specific RLC bearers (e.g., the default transmission path introduced in the present implementations) as the transmission path(s) once the Duplication Activation MAC CE is received. Afterward, the UE may be indicated to apply additional RLC bearer(s) (pair) as the transmission path via another specific MAC CE following some pre-defined/pre-configured configuration and/or rule(s). The additional RLC bearer(s) (pair) is referred herein as the extra RLC bearer (pair).

Some of the present implementations provide a mechanism for extra transmission path configuration.

A UE's PDCP entity may be configured with PDCP duplication by receiving the downlink RRC message transmitted by the base station. The PDCP entity may also be configured for association with multiple corresponding RLC bearers. Unlike the NR PDCP duplication, in some of the present implementations, the base station may configure more than two RLC bearers to be associated with the PDCP entity. However, only two specific configured/associated RLC bearers may be applied as the transmission path when the corresponding NR Duplication Activation/Deactivation MAC CE is received and the NR Duplication Activation/Deactivation MAC CE had indicated that the DRB corresponding the duplication is activated.

The two specific RLC bearers may be indicated by reusing the configuration IEs introduced above in Table 1 (e.g., indicated by the DefaultPath IE), in Table 2 (e.g., indicated by the TransPath. IE), in Table 3 (e.g., indicated by the DefaultLCH IE), and/or in Table 4 (e.g., indicated by the RLCBearerPair IE).

The base station preconfigured transmission path may be applied after the PDCP duplication function is activated by the NR Duplication Activation/Deactivation MAC CE. The base station may also reuse the configuration IEs introduced in Table 1. (e.g., indicated by the DefaultPath IE), in Table 2 (e.g., indicated by the TransPath IE), in Table 3 (e.g., indicated by the DefaultLCH IE), and/or in Table 4 (e.g., indicated by the RLCBearerPair IE) to indicate UE the extra transmission path(s) (e.g., RLC bearers/RLC bearer pair) which need(s) to be further applied as the transmission path when a new Multi-path Duplication Activation/Deactivation MAC CE is received and the new Multi-path Duplication Activation/Deactivation MAC CE had indicated the UE to additionally apply the (pre-configured) extra RLC bearers (e.g., extra RLC bearer (pair)) to be additional transmission path(s). It should be noted that the Multi-path Duplication Activation/Deactivation MAC CE of the present implementations may also indicate the UE to deactivate the extra transmission path(s).

The format of the Multi-path Duplication Activation/Deactivation MAC CE of the present implementations may reuse the format of FIG. 4. The Multi-path Duplication Activation/Deactivation MAC CE of the present implementations may have a fixed size and may include a single octet 400 with eight D-fields. The Multi-path Duplication Activation/Deactivation MAC CE for a MAC entity may be defined as follows. The $D_i$ field may indicate the activation/deactivation status of the extra RLC bearers/RLC bearer pair associated with the PDCP duplication of DRB I, where i is the ascending/descending order of the DRB ID among the DRBs configured with the PDCP duplication and with the RLC entity(s) associated with the UE's MAC entity. In another implementation, the i may be the ascending/descending order of the DRB ID among the DRBs configured with the PDCP duplication mechanism and with extra RLC bearer/RLC bearer pair associated with the UE's MAC entity.

The $D_i$ field may be set to one to indicate that the extra RLC bearer/RLC bearer pair of the PDCP duplication of DRB i shall be activated. The $D_i$ field may be set to zero to indicate that the extra RLC bearer/RLC bearer pair of the PDCP duplication of DRB i shall be deactivated.

In another implementation, the base station may apply the mechanism introduced in FIGS. 5 and 6 to indicate UE to activate/deactivate a specific preconfigured RLC bearer/RLC bearer pair as the extra transmission path. As described above, the $D_i$ field may indicate which of the RLC bearer/RLC bearer pair is required to be activated/deactivated as the extra transmission path.

The Multi-path Duplication Activation/Deactivation MAC CE of the present implementations may also be applied by the base station to indicate the UE to activate not only the two preconfigured RLC bearers but also to activate the extra RLC bearer/RLC bearer pair corresponding to the PDCP duplication function. Once a PDCP duplication function has activated the two preconfigured RLC bearers, the extra RLC bearer/RLC bearer pair may be activated. The NR Duplication Activation/Deactivation MAC CE may also be applied by the base station to indicate the UE to deactivate both the two preconfigured RLC bearers and the extra RLC bearer/RLC bearer pair at the same time.

In some of the present implementations, the non-extra transmission path that belong to a specific cell group (e.g., the master cell group or the secondary cell group) may be implicitly indicated/considered as the non-extra transmission path. Alternatively, the extra transmission path that belong to a specific cell group (e.g., the master cell group or the secondary cell group) may implicitly be indicated/considered as the extra transmission path.

Some of the present implementations may specify an initial state of the PDCP initiation. Similar to the p&p-Duplication IE explained in NR PDCP duplication function, a specific IE (e.g., the extra-path IE) may be introduced to indicate the initial state of the extra RLC bearer/RLC bearer pair (e.g., the extra transmission path). As shown in Table 5, similar to the transpath implementation of Table 2, the extra-path IE may indicate whether or not the extra transmission path status at the time of receiving this IE is configured and activated. The presence of this field may indicate whether the duplication is configured with extra transmission path. The value of this field, when the field is present, may indicate the initial state of the extra transmission path. If set to TRUE, the extra transmission path may be activated.

TABLE 5

PDCP-Config information element

```
-- ASN1START
-- TAG-PDCP-CONFIG-START
PDCP-Config ::=            SEQUENCE {
moreThanOneRLC                SEQUENCE {
    primaryPath                   SEQUENCE {
        cellGroup                     CellGroupId              OPTIONAL, -- NeedR
        logicalChannel                LogicalChannelIdentity   OPTIONAL -- Need R
    },
        TransPathToAddModList  SEQUENCE (SIZE(1..maxTransPath)) OF TransPath
OPTIONAL,
        TransPathToReleaseList SEQUENCE (SIZE(1..maxTransPath)) OF TransPath
OPTIONAL,
        ul-DataSplitThreshold         UL-DataSplitThreshold            OPTIONAL, -- Cond
SplitBearer
        pdcp-Duplication              BOOLEAN                  OPTIONAL -- Need R
        extra-path                    BOOLEAN
        TransPath              SEQUENCE {
            cellGroup                     CellGroupId              OPTIONAL,
            logicalChannel                LogicalChannelIdentity   OPTIONAL
        },
    } OPTIONAL, - Cond MoreThanOneRLC
(Some non-direct related IE(s) is skipped)
-- TAG-PDCP-CONFIG-STOP
-- ASN1STOP
```

It should be noted that each of the transmission path/RLC bearer/RLC bearer pairs may also be indicated, by the base station via a specific IE within the RRC downlink message, the initial state (e.g., whether the transmission path/RLC bearer/RLC bearer pairs is applied for PDCP PDU submission) while receiving the corresponding configuration.

Figure 8:
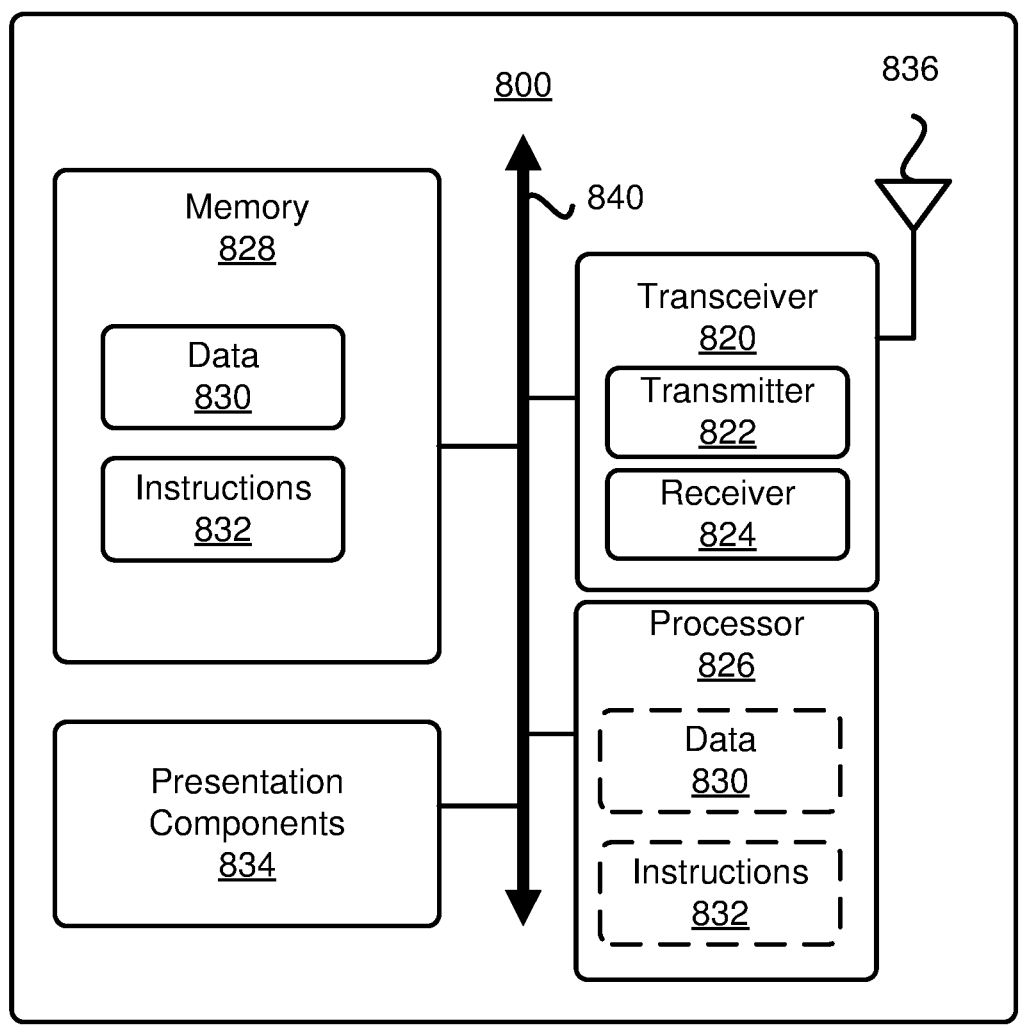
FIG. 8 illustrates a block diagram of a node for wireless communication, according to one example implementation of the present application.

FIG. 8 illustrates a block diagram of a node for wireless communication, according to one example implementation of the present application. As shown in FIG. 8, node 800 may include transceiver 820, processor 826, memory 828, one or more presentation components 834, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control signalings.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, RUM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 8. Alternatively, instructions 832 may not be directly executable by processor 826 but be configured to cause node 800 (e.g., when compiled and executed) to perform various functions described herein.

Processor 826 may include an intelligent hardware device, for example, a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. For example, one or more presentation components 834 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for activating and deactivating radio link control (RLC) entities in a user equipment (UE), the method comprising:
   receiving a downlink radio resource control (RRC) message carrying a first indicator, a second indicator, and a packet data convergence protocol (PDCP) duplication configuration for a PDCP entity that is associated with a plurality of RLC entities, the plurality of RLC entities also associated with a medium access control (MAC) entity, wherein:
      the first indicator indicates that a first RLC entity of the plurality of RLC entities is a default active RLC entity, and
      the second indicator indicates an initial status of each of remaining RLC entities in the plurality of RLC entities;
   receiving, by the MAC entity of the UE, a downlink MAC control element (CE) comprising at least a third indicator and a fourth indicator, wherein:
      the third indicator indicates an identity of a dedicated radio bearer (DRB), and
      the fourth indicator includes a plurality of bits and a position of each bit in the plurality of bits identifies a corresponding RLC entity in the plurality of RLC entities;
   determining whether the MAC CE is associated with the PDCP entity based on the identity of the DRB matching a DRB associated with the PDCP entity;
   when the MAC CE is associated with the PDCP entity, selecting a first set of RLC entities among the plurality of RLC entities, the first set selected based on the first and fourth indicators;
   when the MAC CE is not associated with the PDCP entity, selecting a second set of RLC entities among the plurality of RLC entities, the second set selected based on the first and second indicators; and generating, by the PDCP entity, duplicated PDCP packets and transmitting the duplicated PDCP packets to the selected first or second set of RLC entities.

2. The method of claim 1, wherein the position of each bit in the fourth indicator identifies the corresponding RLC entity according to an ascending order of a value of a logical channel identity (LCID) associated with the RLC entity.

3. The method of claim 1, further comprising, before determining whether the MAC CE is associated with the PDCP entity:

determining whether a PDCP duplication function is activated based on the first and second indicators; and generating, by the PDCP entity, the duplicated PDCP packets when the PDCP duplication function is activated.

4. The method of claim 3, wherein determining whether to perform the PDCP duplication function comprises determining to perform the PDCP duplication function when:

the identity of the DRB indicated by the third indicator matches the DRB associated with the PDCP entity; and at least one of the plurality of bits in the fourth indicator is not zero.

5. The method of claim 1, wherein selecting the second set of RLC entities comprises, for each bit of the fourth indicator, if a value of the bit is one, selecting the bit's corresponding RLC entity and if the value of the bit is zero, not selecting the bit's corresponding RLC entity.

6. The method of claim 1, wherein the second indicator includes a second plurality of bits, wherein selecting the first set of RLC entities comprises, for each bit of the second indicator, if a value of the bit is one, selecting the bit's corresponding RLC entity and if the value of the bit is zero, not selecting the bit's corresponding RLC entity.

7. A user equipment (UE) comprising:

one or more non-transitory computer-readable media storing computer-executable instructions for activating and deactivating radio link control (RLC) entities in the UE; and at least one processor coupled to the one or more non-transitory computer-readable media, and configured to execute the computer-executable instructions to:

receive a downlink radio resource control (RRC) message carrying a first indicator, a second indicator, and a packet data convergence protocol (PDCP) duplication configuration for a PDCP entity that is associated with a plurality of RLC entities, the plurality of RLC entities also associated with a single medium access control (MAC) entity, wherein:

the first indicator indicates that a first RLC entity of the plurality of RLC entities is a default active RLC entity, and the second indicator indicates an initial status of each of remaining RLC entities in the plurality of RLC entities;

receive, by the MAC entity of the UE, a downlink MAC control element (CE) comprising at least a third indicator and a fourth indicator, wherein:

the third indicator indicates an identity of a dedicated radio bearer (DRB), and the fourth indicator includes a plurality of bits and a position of each bit in the plurality of bits identifies a corresponding RLC entity in the plurality of RLC entities;

determine whether the MAC CE is associated with the PDCP entity based on the identity of the DRB matching a DRB associated with the PDCP entity;

when the MAC CE is associated with the PDCP entity, select a first set of RLC entities among the plurality of RLC entities, the first set selected based on the first and fourth indicators;

when the MAC CE is not associated with the PDCP entity, select a second set of RLC entities among the plurality of RLC entities, the second set selected based on the first and second indicators; and generate, by the PDCP entity, duplicated PDCP packets and transmit the duplicated PDCP packets to the selected first or second set of RLC entities.

8. The UE of claim 7, wherein the position of each bit in the fourth indicator identifies the corresponding RLC entity according to an ascending order of a value of a logical channel identity (LCID) associated with the RLC entity.

9. The UE of claim 7, wherein the at least one processor is further configured to execute the computer-executable instructions to, before determining whether the MAC CE is associated with the PDCP entity:

determine whether a PDCP duplication function is activated based on the first and second indicators; and generate, by the PDCP entity, the duplicated PDCP packets when the PDCP duplication function is activated.

10. The UE of claim 9, wherein determining whether to perform the PDCP duplication function comprises determining to perform the PDCP duplication function when:

the identity of the DRB indicated by the third indicator matches the DRB associated with the PDCP entity; and at least one of the plurality of bits in the fourth indicator is not zero.

11. The UE of claim 7, wherein selecting the second set of RLC entities comprises, for each bit of the fourth indicator, if a value of the bit is one, selecting the bit's corresponding RLC entity and if the value of the bit is zero, not selecting the bit's corresponding RLC entity.

12. The UE of claim 7, wherein the second indicator includes a second plurality of bits, wherein selecting the first set of RLC entities comprises, for each bit of the second indicator, if a value of the bit is one, selecting the bit's corresponding RLC entity and if the value of the bit is zero, not selecting the bit's corresponding RLC entity.

* * * * *